No. 794,143. PATENTED JULY 4, 1905.
J. F. DE JARNETTE.
VEHICLE WHEEL.
APPLICATION FILED JAN. 23, 1905.

Witnesses
Inventor
James F. De Jarnette.
By
Attorney

No. 794,143. Patented July 4, 1905.

UNITED STATES PATENT OFFICE.

JAMES F. DE JARNETTE, OF OMAHA, NEBRASKA, ASSIGNOR TO EBY MANUFACTURING COMPANY, OF OMAHA, NEBRASKA, A CORPORATION.

VEHICLE-WHEEL.

SPECIFICATION forming part of Letters Patent No. 794,143, dated July 4, 1905.

Application filed January 23, 1905. Serial No. 242,285.

*To all whom it may concern:*

Be it known that I, JAMES F. DE JARNETTE, a citizen of the United States, residing at Omaha, in the county of Douglas and State of Nebraska, have invented certain new and useful Improvements in Vehicle-Wheels, of which the following is a specification.

My invention relates to improvements in vehicle-wheels; and the object of my invention is the provision of a wheel which will possess great strength and durability and which will have a spring or elastic action to insure a smooth, even, and comfortable travel of the vehicle.

To attain these desired objects, my invention consists of a vehicle-wheel embodying novel features of construction and combinations of parts substantially as disclosed herein.

Figure 1:
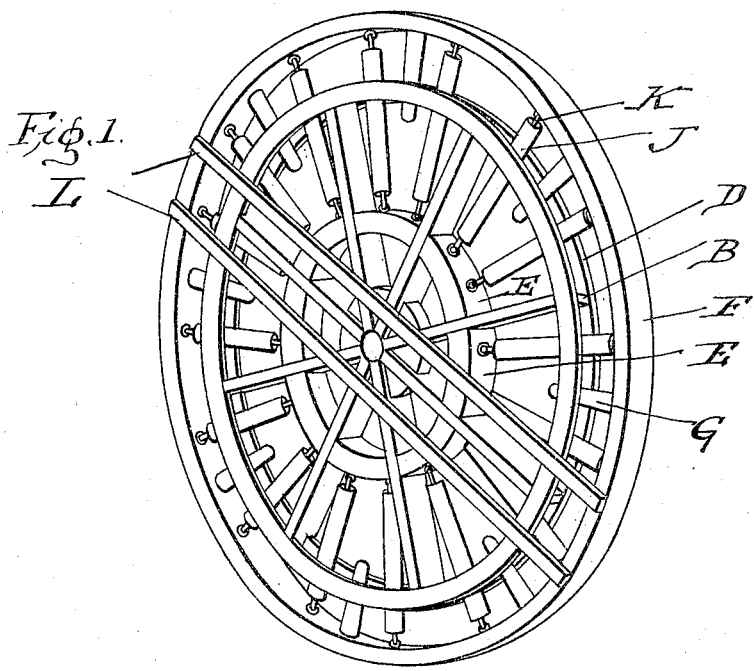
Figure 2:
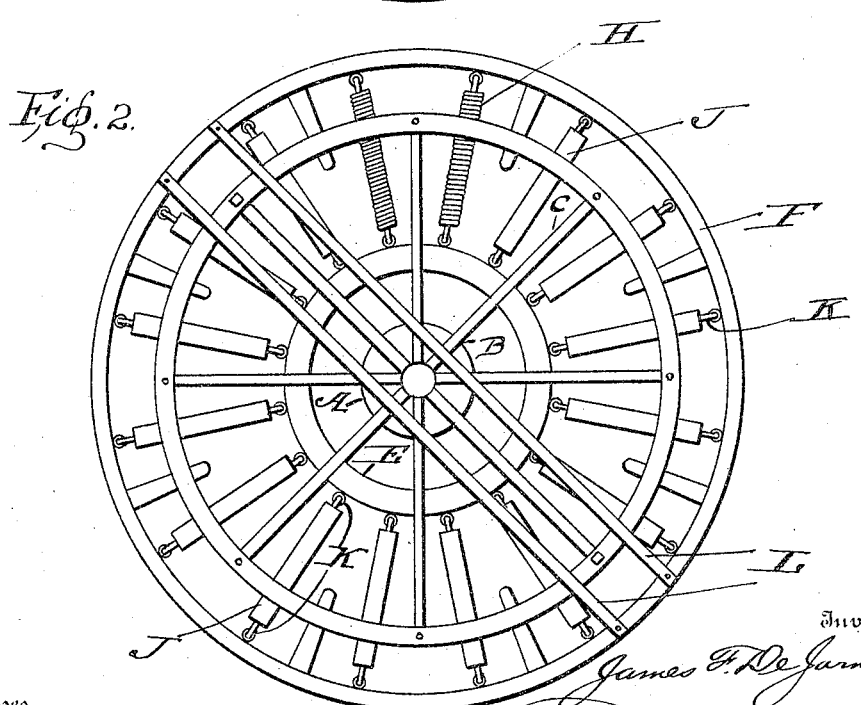

Figure 1 represents a perspective view of my complete wheel, and Fig. 2 represents a side elevation.

My wheel comprises the hub A, from which extend and in which are fitted, by means of sockets B, the spokes C, to the outer ends of which is connected the open rim D, and between the latter and the hub is the closed band E. Surrounding the outer open rim D is the tire-rim F, projecting inwardly from which are the studs or pins G, which have their inner ends passing between the open rim D, and connecting the band E with the tire-rim is the series of coil-springs H, which are incased in flexible covers or jackets J and are secured by means of the hook-and-eye fastenings K at each end, and to brace and secure the wheel I use the cross-strips L.

From this construction it is evident that the hub is practically suspended and elastically mounted and guided within the rim of the wheel and while possessing the necessary strength and durability will insure a smooth and easy riding.

I claim—

1. A vehicle-wheel, consisting of the outer rim or tire, the hub, the closed band connected with the hub, elastic connections between the closed band and the outer rim or tire, and means to prevent lateral movement of the interior rims within the tire.

2. A vehicle-wheel, consisting of the outer rim or tire, the hub, a closed band and an open rim connected to the hub, elastic spring connections between said closed band and the outer rim or tire, and studs or pins projecting from the rim or tire inwardly to prevent lateral movement of the rims.

3. A vehicle-wheel, consisting of the outer rim or tire, bracing-strips across the tire or rim, a hub, a closed band surrounding said hub and elastic means connecting said band and the outer rim or tire.

4. A vehicle-wheel consisting of the outer rim or tire, the hub, the spokes leading from the hub, the open rings and the closed band connected to said spokes, the studs or pins extending from the tire into the open ring, and the springs connecting the closed band with the tire.

In testimony whereof I affix my signature in presence of two witnesses.

JAMES F. DE JARNETTE.

Witnesses:
 HIRAM A. STURGES,
 GEORGE W. COVELL.